US011811453B2

(12) United States Patent
Ma et al.

(10) Patent No.: US 11,811,453 B2
(45) Date of Patent: Nov. 7, 2023

(54) UPWARD COLLAPSE PROCESS AND APPARATUS FOR MAKING GLASS PREFORMS

(71) Applicant: Heraeus Quartz North America LLC, Buford, GA (US)

(72) Inventors: Qiulin Ma, Alpharetta, GA (US); Kai Huei Chang, Decatur, GA (US); Evan P. Green, Lawrenceville, GA (US); James E. Beavers, Jr., Flowery Branch, GA (US); Carl W. Ponader, Buford, GA (US)

(73) Assignee: HERAEUS QUARTZ NORTH AMERICA LLC, Buford, GA (US)

( * ) Notice: Subject to any disclaimer, the term of this patent is extended or adjusted under 35 U.S.C. 154(b) by 0 days.

(21) Appl. No.: 17/824,477

(22) Filed: May 25, 2022

(65) Prior Publication Data

US 2022/0286204 A1    Sep. 8, 2022

Related U.S. Application Data

(62) Division of application No. 15/813,669, filed on Nov. 15, 2017, now Pat. No. 11,405,107.

(Continued)

(51) Int. Cl.
*C03B 37/012* (2006.01)
*H04B 10/2507* (2013.01)
(Continued)

(52) U.S. Cl.
CPC ..... *H04B 10/2507* (2013.01); *C03B 37/0126* (2013.01); *C03B 37/01211* (2013.01);
(Continued)

(58) Field of Classification Search
CPC ......... C03B 37/01211; C03B 37/01248; C03B 37/0126
See application file for complete search history.

(56) References Cited

U.S. PATENT DOCUMENTS 5,578,106 A  11/1996  Fleming, Jr. et al.
5,658,363 A   8/1997  Ince et al.
(Continued)

FOREIGN PATENT DOCUMENTS

CN  103380091 A  10/2013
DE      3506660     8/1986
(Continued)

OTHER PUBLICATIONS

Extended European Search Report dated Apr. 9, 2018 by the European Patent Office for counterpart European Patent Application No. 17201823.6.
(Continued)

*Primary Examiner* — Erin Snelting
(74) *Attorney, Agent, or Firm* — Panitch Schwarze Belisario & Nadel LLP

(57) ABSTRACT

An apparatus for producing large glass preforms with minimal clad to-core waveguide distortion from a glass body having a weight, an outer surface, core rods, and a cladding surrounding and separated from the core rods by a gap. The apparatus includes collars affixed to the top and bottom of the cladding; a spacer upon which the core rods rest; a first unit holding and supporting both the bottom collar and the spacer; a second unit holding and supporting the top collar; and a frame defining a heating zone having a heating element to heat the glass body. The weight of the glass body above and below the molten glass in the heating zone is supported by the first and second units without contacting the outer surface of the glass body.

5 Claims, 9 Drawing Sheets

Related U.S. Application Data

(60) Provisional application No. 62/425,274, filed on Nov. 22, 2016.

(51) Int. Cl.
  G01B 11/08 (2006.01)
  G01B 11/25 (2006.01)
  G02B 6/02 (2006.01)
  G01N 21/41 (2006.01)
  G06T 7/60 (2017.01)

(52) U.S. Cl.
  CPC .. C03B 37/01245 (2013.01); C03B 37/01248 (2013.01); G01B 11/08 (2013.01); G01B 11/25 (2013.01); G02B 6/02 (2013.01); G01N 21/412 (2013.01); G06T 7/60 (2013.01); Y02P 40/57 (2015.11)

(56) References Cited

U.S. PATENT DOCUMENTS

| | | | |
|---|---|---|---|
| 6,053,013 | A | 4/2000 | Oh et al. |
| 6,405,566 | B1 | 6/2002 | Oh |
| 2002/0097774 | A1 | 7/2002 | Simons et al. |
| 2003/0140658 | A1 | 7/2003 | Caiata et al. |
| 2003/0145630 | A1* | 8/2003 | Hirano .............. C03B 37/01228 65/412 |
| 2007/0209400 | A1 | 9/2007 | Hofmann et al. |
| 2008/0028797 | A1 | 2/2008 | Sattmann |
| 2008/0107385 | A1 | 5/2008 | Ohga et al. |
| 2013/0086952 | A1* | 4/2013 | Charbonneau .......... C03B 5/24 65/29.13 |
| 2014/0174134 | A1 | 6/2014 | Fattal et al. |
| 2014/0186645 | A1 | 7/2014 | Briere et al. |
| 2017/0320768 | A1 | 11/2017 | Ma et al. |

FOREIGN PATENT DOCUMENTS

| | | |
|---|---|---|
| EP | 0501429 | 9/1992 |
| EP | 1182173 | 2/2002 |
| EP | 1567457 B1 | 4/2013 |
| JP | S55162441 | 12/1980 |
| JP | S60186431 | 9/1985 |
| JP | H04-042831 A | 2/1992 |
| JP | H06-56453 | 3/1994 |
| JP | H10-167744 A | 6/1998 |
| JP | 2001-010839 | 1/2001 |
| JP | 2002-053333 | 2/2002 |
| JP | 2006-193397 A | 7/2006 |
| WO | 2016/022151 | 2/2016 |
| WO | 2016/024965 | 2/2016 |
| WO | 2016/060646 A1 | 4/2016 |
| WO | 2016/118144 | 7/2016 |

OTHER PUBLICATIONS

Office Action dated Aug. 3, 2021 by the Japanese Patent Office for counterpart Japanese Patent Application No. 2017-220135 (with English translation of the office action attached).

Office Action dated Aug. 4, 2021 by the China National Intellectual Property Administration for counterpart Chinese Patent Application No. 201711129136.2 (with English translation of the office action attached).

* cited by examiner

UPWARD COLLAPSE PROCESS AND APPARATUS FOR MAKING GLASS PREFORMS

CROSS-REFERENCE TO RELATED APPLICATION

This application is a divisional of U.S. patent application Ser. No. 15/813,669 filed Nov. 15, 2017 that claims the benefit of priority under 35 U.S.C. § 119(e) to earlier filed U.S. Provisional Patent Application No. 62/425,274 filed Nov. 22, 2016, the entire disclosures of which are incorporated by reference herein.

TECHNICAL FIELD

This application relates generally to producing elongated glass components and, more particularly, to using a process and apparatus for making such components with minimal clad-to-core waveguide distortion.

BACKGROUND

The field of applied science and engineering concerned with the design and application of optical fibers is known as fiber optics. An optical fiber is a flexible, transparent fiber made by drawing glass (silica) down to a diameter slightly thicker than that of a human hair. Optical fibers are used most often to transmit light between the two ends of the fiber and are used widely in fiber-optic communications, where they permit transmission over longer distances and at higher bandwidths (data rates) than wire cables. Fibers are used instead of metal wires because signals travel along fibers at high capacity with reduced loss. In addition, fibers are also immune to electromagnetic interference, a problem that plagues metal wires. Fibers are also used for illumination, and are wrapped in bundles so that they may be used to carry images, thus allowing viewing in confined spaces, as in the case of a fiberscope. Specially designed fibers are also used for a variety of other applications, such as fiber optic sensors and fiber lasers.

Optical fibers typically include a transparent core surrounded by a transparent cladding material with a lower index of refraction. Light is kept in the core by the phenomenon of total internal reflection which causes the fiber to act as a waveguide. Fibers that support many propagation paths or transverse modes are called multimode fibers; those that support a single mode are called single-mode fibers.

Today, tight optical fiber cutoff wavelength specifications must be met, and yield loss to achieve those specifications is not tolerated. Cutoff wavelength can be defined as the wavelength below which a single mode optical fiber will act as a multimode fiber. Or, in other words, cutoff wavelength can be defined as the wavelength above which single mode operation is ensured in a single mode optical fiber. Many network planners now realize that cable cutoff wavelength is one of the most important parameters to define while preparing an optical fiber cable specification.

SUMMARY

To solve the problems inherent in conventional downward draw systems and processes, a first object of an apparatus and related upward collapse process of using that apparatus for producing an optical fiber preform is minimization, and perhaps elimination, of waveguide (clad-to-core) distortion effects. A second object is to minimize, and perhaps eliminate, the wastes and assembly problems inherent in conventional downward draw systems and processes. A third object is to achieve the largest preform sizes with excellent geometry and waveguide properties for the highest productivity in subsequent fiber draw. A fourth object is to achieve the highest quality (cleanest and driest) RIT or RIC preform interface. A fifth object is to allow stacking of multiple free-standing core rods of arbitrary lengths inside the cylinder (without welding them together) so that their weight is fully and independently supported in the assembly to achieve nearly zero waste in the overclad process for the precious and expensive core rods and cylinders. Additional objects are to allow online tipping and to achieve nearly 100% finished preform yield.

A further object is to allow both floating positioning of the glass body used to make the preform in the horizontal (X-Y) plane and precision linear movement in the vertical (z) direction for exact alignment and control of preform geometry. A still further object is to monitor the behavior of the glass body during heating by one or more load cells. Yet a further object is to use physics and conservation of mass for precise dimensional controls, eliminating the expense of conventional online measurements and feedback controls.

Another object is to use a reactive gas to etch, clean, and dry the preform interface. It is still another object to provide an inherently clean process that: (1) avoids direct contact with the preform outer surface, and (2) completely seals the preform assembly so its interface is shielded from the outside environment, particularly from the contaminants inside the heating element (e.g., furnace) of the apparatus during the vacuum initiation. A related object is to support the preform weight without contacting the outer surface of the preform. Other related objects are to avoid lateral or transverse forces on the preform during the manufacturing process, and to minimize or eliminate preform bow. Yet another object is to improve the quality of the preform or fiber interface by, for example, avoiding airlines, bubbles, fiber breaks, and loss problems.

It is also an object to use finite element modeling to develop efficiently the optimum upward draw recipe. A related object is to save precious furnace production capacity by reducing the number of trials necessary during development. Still another related object is to allow an exact understanding of the complex thermal physics of furnace heating and glass flow, particularly at the two ends of the preform where the final amounts of good preform and optical fiber yield can be "squeezed" out.

Still another object is to provide, in combination with the apparatus and related upward collapse process of using that apparatus for producing an optical fiber preform, a preform measurement capability with a camera system and a patterned background. A related object is to provide an automated, non-destructive, and production-friendly measurement of waveguide geometrical properties. Still another related object is to provide a value-added guarantee of waveguide quality for users of the preform and a potential opportunity to fine tune optical fiber draw.

To achieve the above objects, there is provided an apparatus and related upward collapse process of using that apparatus to make a glass preform with minimal clad to-core waveguide distortion. The apparatus accepts a glass body having a weight, a circumference, and a core rod and a cladding ("cylinder") separated by a gap. The apparatus includes a top collar affixed to the top of the cladding, the top collar having an outside diameter approximately the same as or smaller than the outside diameter of the cladding; a bottom collar affixed to the bottom of the cladding, the bottom collar having an outside diameter either smaller than or approximately the same as the outside diameter of the cladding; at least one spacer upon which the free-standing stacked core rods rest; a bottom collar holder and vacuum unit holding and supporting both the bottom collar and the at least one spacer, thereby supporting the entire weight of the glass body without contacting the circumference of the glass body, the bottom collar holder and vacuum unit removing gas from or introducing gas to the apparatus; a top collar holder and vacuum unit holding and supporting the top collar, the top collar holder and vacuum unit removing gas from or introducing gas to the apparatus; and an overclad or draw tower structure or frame having a heating element and a defined heating zone to heat the glass body, collapse the cladding onto the core rod, close the gap, and create the glass preform.

The related upward collapse process creates a glass preform having minimum clad-to-core waveguide distortion. The process provides a glass body having a weight, a circumference, and a core rod and a cladding ("cylinder") separated by a gap. A top collar is affixed to the top of the cladding and a bottom collar is affixed to the bottom of the cladding. The bottom collar is supported with a bottom collar holder and vacuum unit located below a heating zone positioned in the draw tower. The free-standing stacked core rods (i.e., not welded together) are supported on at least one spacer upon which the stacked core rods rest and which is supported by the bottom collar holder and vacuum unit, such that the bottom collar holder and vacuum unit supports the entire weight of the glass body without contacting the circumference of the glass body. The top collar is supported with a top collar holder and vacuum unit located above the heating zone. The glass body is positioned and moved upwards in a predetermined recipe with respect to the center of a heating element located in the heating zone. As the glass body is fed upward through the heating zone, the cladding collapses onto the core rod, thereby closing the gap and creating the glass preform.

It is to be understood that both the foregoing general description and the following detailed description are exemplary, but are not restrictive, of the invention.

BRIEF DESCRIPTION OF DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

Figure 1:
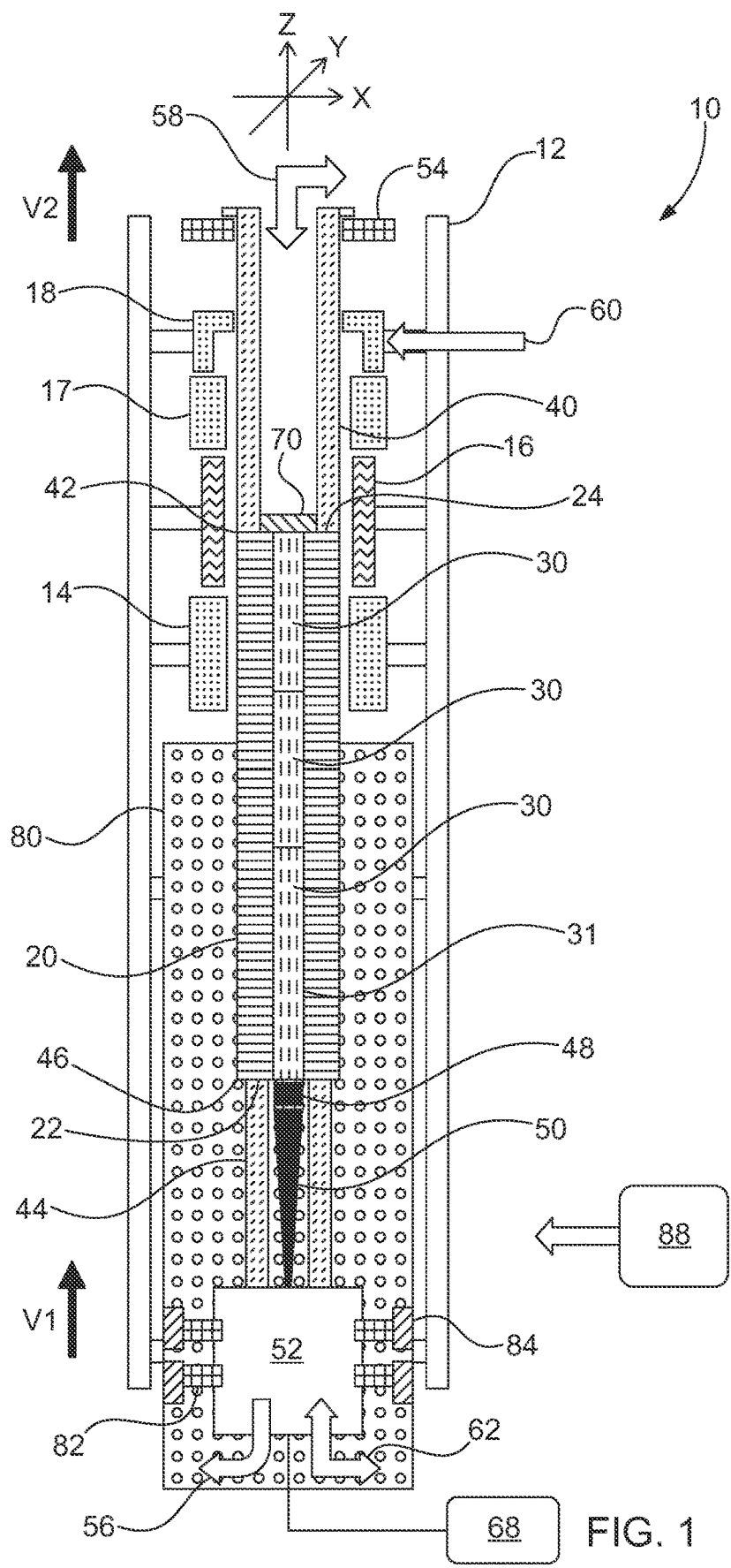
FIG. 1 is a schematic illustrating the main components of the apparatus used in the upward collapse process of forming an elongated component of glass.

An optical fiber is generally fabricated in two, separate processes. First, a core rod is prepared and then a preform is fabricated by a rod-in-tube (RIT) or rod-in-cylinder (RIC) process, or by another overclad process such as an outside vapor deposition (OVD) process. Second, the fabricated preform is heated inside a furnace and drawn into optical fiber. A conventional process and apparatus for producing the optical fiber preforms, completing the first of the two processes, may include the provision of an optical fiber RIT overclad apparatus.

The overclad apparatus includes a vertical lathe, a chuck installed in each end of the vertical lathe, a carriage in the vertical lathe for vertically moving between both ends of the vertical lathe, an oxygen-hydrogen burner installed in the carriage, a furnace installed in the carriage, a vacuum pump provided at an end of the vertical lathe, a coupler for connecting the vacuum pump to the end of the vertical lathe, and a controller outside the vertical lathe for controlling the vertical movement of the carriage, the flow rate of the oxygen-hydrogen burner, and the rotation of the chucks. The furnace preheats or heats a glass tube to overclad a core rod with the glass tube.

In practice, the outside diameter of the preform is limited to 90 mm or less in the conventional RIT overclad apparatus. That limitation is imposed by inefficient heating by the oxygen-hydrogen burner. Furthermore, a handle must be welded to a single core rod (of the same length as the RIT overclad tube) in order to provide a separate support for the core rod weight from the top end. This results in two disadvantages: (1) waste of core rod material because short core rods cannot be used effectively; and (2) welding of the handle to the core rod, especially with an oxygen-hydrogen torch, results in surface hydroxide (OH) incorporation on the surface of the core rod which if not etched away (an additional cost for the process) can increase fiber attenuation particularly at 1,383 nm due to OH absorption.

More recently, preforms for quartz glass tubing, rods, or collapsed offline rod-in-cylinders (ORICs) have been produced by introducing a quartz glass component (e.g., a cylinder, an ingot, or an uncollapsed RIC) into an apparatus including a heating zone (e.g., a furnace) in a vertical orientation such that the lower end begins to soften and form a strand. The strand is then placed in a pulling device including one or more sets of pulling wheels. The rate of draw of the strand is controlled by the speed of the pulling wheels, which may apply either a downward or an upward force depending on the forming zone temperature or viscosity and the weight of the strand supported by the wheels. Forming is accomplished without the aid of a die. Thus, the strand dimensions are controlled by the feed rate of the quartz glass component, the temperature of the heating zone, and the speed of the pulling wheels.

With the conventional ORIC process, a cylinder (typically 3 m long with an outside diameter of about 200 mm) made of synthetic, high-purity glass is collapsed onto a high-purity glass core rod to form an optical fiber preform with heat and vacuum at the interface gap. The preform is usually drawn downward continuously with a diameter significantly smaller than the original diameter of the cylinder. Sufficient vacuum must be applied to the gap between the cylinder and core rod to facilitate interface collapse as well as to support the weight of the core rod through the softened glass. Vacuum is essential to prevent core rod movement with respect to the cylinder; otherwise, the clad-to-core ratio of the resulting preforms will be distorted and fibers drawn from them will fail to meet the required waveguide specifications (such as the cutoff wavelength). Complicated and expensive preform outside diameter measurements and feedback controls are also needed in the downward collapse, stretch, and draw process and, even with such controls, it is difficult to achieve precise preform geometry (including low preform bow or curvature and diameter variation) and waveguide properties free of clad-to-core distortions. This inherent waveguide distortion effect in the downward draw process is in large part due to the gravitational and vacuum forces acting on the molten glass and the un-attached core rod in the furnace where the outer cladding glass, being hotter, flows downward faster than the inner core rod glass.

There is a significant difficulty in producing the largest preforms with outside diameters close to the original cylinder or cladding size with the conventional downward draw systems and processes. A significant amount of good preform glass is wasted at the start-up and at the end of the process where the geometry and waveguide properties of the preform are far from required specifications in terms of such parameters as geometry, clad-to-core ratio, core eccentricity and bow. Thus, the conventional preform systems and processes have distinct drawbacks.

According to the embodiments of the invention, apparatus and upward collapse process are provided that yield a preform with the largest outside diameter and length known to exist (namely, an outside diameter of about 200 mm, where conventional outside diameters are limited to about 150 mm, and a length of about 3 m, or about the same size as the original cylinder or cladding) with almost no waveguide (clad-to-core) distortion and at significantly reduced waste and cost. Conventional optical fiber preforms have an outer diameter of 90 to 150 mm. In the streamlined upward collapse process, the stacked core rods in the ORIC cladding are supported from below (so the core rods do not move relative to the cladding in the collapse process) and the whole ORIC assembly moves up with respect to the furnace so the preform is continuously collapsed and drawn upward as illustrated in FIG. 1 and described below. The apparatus and upward collapse process: (1) produce the largest known preform because they can be made in a collapse-only process with the largest known overclad cylinder, (2) reduce cost because of nearly 100% overclad and finished (tipped) preform yield (nearly no waste) and a streamlined and simplified (e.g., no on-line measurement or feedback controls) process including an integrated online preform tipping process (a saving of processing time and a heating step), (3) improve waveguide quality because of the inherently low waveguide (clad-to-core) distortion with fixed, stacked, and supported core rods of variable and arbitrary lengths, and (4) allow reactive gas (such as $SF_6$) to be applied to the interface up to about one atmosphere (i.e., no need for vacuum) for improved interface and lower core rod D/d ratio (interface closer to the waveguide core).

The D/d ratio for the core rod is the ratio of the outside diameter of the core rod to the diameter of the waveguide core (where light propagates), where "D" is the outside diameter of the core rod and "d" is the diameter of the waveguide core. The ratio is very important to those who use RIT or RIC preforms to produce optical fibers in defining core capacity expansion. As the D/d ratio of the core rod decreases, the interface gets closer to the waveguide core and this means the relative amount of glass needed in the core rod decreases (while the amount of glass in the cladding needs to increase). This in turn means that with the same core rod manufacturing facility its capacity for making core rod (or equivalent capacity for optical fiber core) scales roughly as the square of D/d (e.g., a doubling of core capacity by reducing the D/d from 3.3 to 2.3). Reducing core rod D/d presents a significant challenge, however, to the overclad material purity and interface quality because of the exponentially increasing optical power propagation there. Thus, a more aggressive gas etching, cleaning, and drying process at the interface (with $SF_6$ for example) would be needed at lower core rod D/d. In short, a lower D/d ratio (i.e., the interface is closer to the core) allows manufacturers of the preform to (a) expand core capacity easily without expensive investment, and (b) realize more complex and advanced optical fiber designs with refractive index features closer to the core.

Referring to FIG. 1, there is shown an apparatus 10 for producing an optical fiber preform. The apparatus 10 includes a vertically arranged frame 12. From bottom to top, the frame 12 has a lower open end; a pre-heating or lower insulation zone 14; a heating zone 16; a post-heating or upper insulation zone 17; a post-heating cooling, annealing, and oven gas purging zone 18; and an upper open end opposing the lower open end. The heating zone 16 can preferably be heated to temperatures of 500° C. to 2,300° C., and more preferably 1,000° C. to 2,300° C., and still most preferably 1,500° C. to 2,300° C., by a heating element (typically an oven or furnace). More particularly, the heating element is preferably of an annular configuration. The heating element is preferably positioned within or around the frame 12 so as to form the heating zone 16 of the frame 12. An inert gas is injected into the heating element at a high temperature to prevent oxidation of the heating element.

Figure 2:
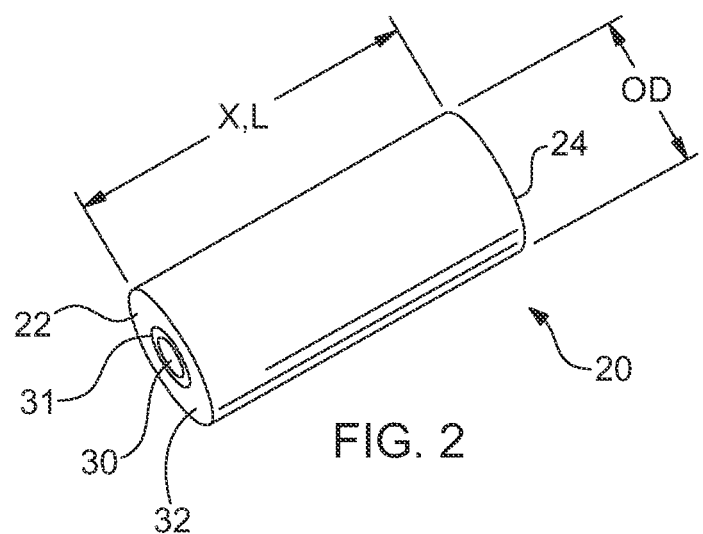
FIG. 2 is a perspective side view of a glass body used to produce an optical component in accordance with an embodiment of the invention.

Referring to FIG. 2, a glass body 20 is used to produce optical fiber preforms. The glass body 20 is of a cylindrical or tubular configuration. The glass body 20 has a length L which extends from a first or upper end 22 to an opposing second or lower end 24. A longitudinal axis X extends between the opposing first and second ends 22, 24. Preferably, both the first and second ends 22, 24 of the glass body 20 are square cut ends.

The glass body 20 is preferably comprised of a glass core or core rod 30 containing the waveguiding optical fiber core and a glass cladding 32 surrounding the core rod 30. More particularly, the core rod 30 is preferably formed in the geometric center of the glass body 20 and extends along the length L of the glass body 20. The cladding 32 is preferably formed over the core rod 30 to radially surround the core rod 30 along the length L of the glass body 20. The cladding 32 surrounds the core rod 30 in a coaxial arrangement aligned along a common center line. A gap 31 exists initially between the core rod 30 and the cladding 32. The cladding 32 has an outside diameter "OD."

The cladding 32 may be pure quartz glass or a doped quartz glass. Preferably, however, the cladding 32 is high purity un-doped or doped quartz glass. The core rod 30 is preferably a mostly high purity quartz glass with doped and un-doped regions to achieve the appropriate refractive index profile. The cladding 32 and the core rod 30 may each be formed by any suitable process, such as fused quartz or one or more types of chemical vapor deposition (CVD), including inside vapor deposition, outside vapor deposition, and vapor axial deposition. The core material at the center the core rod 30 typically has a refractive index which is greater than the refractive index of the material in the surrounding cladding 32 to enable internal reflection of light signals passing through a fiber drawn from the preform, resulting in an effective waveguide.

Returning to FIG. 1, a first or top collar 40 is affixed to the top of the cladding 32. Although other mechanisms can be used to affix the top collar 40 to the cladding 32, a top weld 42 is suitable. The outside diameter of the top collar 40 is approximately the same as or smaller than the outside diameter of the cladding 32. A second or bottom collar 44 is affixed to the bottom of the cladding 32. Although other mechanisms can be used to affix the bottom collar 44 to the cladding 32, a bottom weld 46 is suitable. The outside diameter of the bottom collar 44 is either smaller than or approximately the same as the outside diameter of the cladding 32. The top collar 40 and the bottom collar 44 are both hollow, ring-like components.

The stacked core rods 30 are positioned inside the cladding 32 and rest on top of a short spacer 48 which, in turn, rests on top of a long spacer 50. The short spacer 48 is provided on top of the long spacer 50 to make sure the long spacer 50 is not welded to the preform after the upward collapse process and can then be removed easily from the bottom collar 44. The long spacer 50 is supported by a bottom collar holder and vacuum unit 52 located below the long spacer 50. The bottom collar holder and vacuum unit 52 also holds, as its name implies, and supports the bottom collar 44. The preform assembly (which includes the stacked core rods 30 and the cladding 32 of the glass body 20, along with the top collar 40 and the bottom collar 44 affixed to the cladding 32) and the bottom collar holder and vacuum unit 52 are loaded first onto a top collar holder and vacuum unit 54 located above the oven gas purging zone 18. (The bottom collar holder and vacuum unit 52 and the top collar holder and vacuum unit 54 allow the apparatus 10 to either remove gas from, i.e., create a vacuum, or introduce gas to the apparatus 10 at either end of the apparatus 10. The top collar holder and vacuum unit 54 holds, as its name implies, and supports the top collar 40.) Then the glass body 20 is positioned with respect to the heating zone 16 and, more particularly, to the heating element of the heating zone 16 and moved upwardly through the heating element. The bottom collar holder and vacuum unit 52 is gripped and supported below the heating zone 16; the top collar holder and vacuum unit 54 is gripped and supported above the heating zone 16. Before the heating step starts, the top weld 42 (and, therefore, the top of the cladding 32) is initially placed a predetermined distance below the center of the heating element to avoid thermal shock to the top weld 42. (By "predetermined" is meant determined beforehand, so that the predetermined characteristic must be determined, i.e., chosen or at least known, in advance of some event.) For example, this distance may be about 350 mm.

The upward collapse process of manufacturing a preform using the apparatus 10 is explained with reference to FIG. 1. The glass body 20 is passed through the frame 12, where it is heated, softened, and elongated to form an optical component, such as an optical fiber preform. More particularly, the lower end 24 of the glass body 20 is preferably positioned in a stable manner in the frame 12 at the start of the process and the glass body 20 then progresses in an upward (i.e., opposite the conventional downward) direction through the frame 12. In the frame 12, the glass body 20 is heated in a zone-wise manner in the heating zone 16. A preform is continuously created by melt deformation to collapse the overclad gap 31 and fuse the core rods 30 to the overclad cylinder or cladding 32 (and optionally the preform can be stretched/elongated or shortened/compressed by either pulling or compressing forces applied by the top collar holder and vacuum unit 54 and the bottom collar holder and vacuum unit 52 during the process).

In one embodiment, the glass body 20 is a coaxial assembly of two separate glass components: the stacked core rods 30 and the cladding 32. More particularly, the core rods 30 are in the form of a solid, cylindrical rod and the cladding 32 is in the form of a hollow overclad cylinder surrounding the stacked core rods 30 (i.e., a rod-in-cylinder assembly). In the coaxial assembly, the stacked core rods 30 and the cladding 32 are not fused together before the glass assembly enters the heating zone 16.

As the coaxial assembly of this embodiment of the glass body 20 progresses upward through the frame 12, the core rods 30 and the cladding 32 are heated to a predetermined temperature and time sufficient to cause the two glass components to soften and fuse together to form an integral and consolidated glass body 20. (By "integral" is meant a single piece or a single unitary part that is complete by itself without additional pieces, i.e., the part is of one monolithic piece formed as a unit with another part.) More particularly, as successive portions of the two-piece glass body 20 approach the heating zone 16 and are heated in the heating zone 16, the cladding 32 and the core rods 30 become softened and the softened cladding 32 collapses on and fuses with the core rods 30. At least one, and more preferably a plurality of "ready-to-draw" preforms may then be drawn directly into fiber from the resulting monolithic glass body 20.

Preferably, the coaxial arrangement of this embodiment of the glass body 20 is heated to temperatures of 500° C. to 2,300° C., and more preferably 1,000° C. to 2,300° C., and most preferably 1,500° C.-2,300° C. More preferably, softening and collapsing of the cladding 32 on the core rod 30 occurs at a temperature of 1,000° C. to 2,200° C., and more preferably 1,300° C. to 2,000° C., and most preferably 1,600° C. to 1,800° C. Fusing together of the softened and collapsed cladding 32 with the softened core rod 30 preferably occurs at a temperature of 1,000° C. to 2,200° C., and more preferably 1,300° C. to 2,200° C., and most preferably 1,600° C. to 2,200° C. Those skilled in the art will understand, however, that other factors, such as glass material composition and throughput also affect the temperature at which the cladding 32 will collapse on and fuse with the core rods 30.

The fused interface between the core rods 30 and the cladding 32 is assured to be clean by several components of the apparatus 10. For example, the bottom collar holder and vacuum unit 52 and the top collar holder and vacuum unit 54, which are both sealed, permit the upward collapse process to operate in a vacuum. The bottom collar holder and vacuum unit 52 and the top collar holder and vacuum unit 54 also isolate the preform assembly (particularly the interface) from potential contaminants in the heating element (e.g., furnace) and the outside environment. The furnace and the outside environment are typical sources of contamination for conventional processes, especially during the vacuum initiation process where the ingress of contaminants into the interface is difficult to avoid. In addition, a reactive interface treatment gas can be used to etch, clean, and dry the interface.

EXAMPLES

The following examples are included to more clearly demonstrate the overall nature of the invention. These examples are exemplary, not restrictive, of the invention.

FEM (finite element modelling) is used to develop process recipes via simulation that combine the motion of the cylinder and the heating rate of the oven to avoid thermal shock to the cylinder and culminate with the cylinder reaching temperatures required for collapse at the proper time. With the help of these simulations, as illustrated in FIGS. 3A, 3B, 3C, and 3D, recipes were identified to pre-heat the top of the cladding 32 and start the collapse of the interface between the cladding 32 and the core rods 30 (i.e., closing the gap 31 of the glass body 20) as a standard procedure. These four figures are snap shots of four typical moments in the simulation, which simply try to depict the preheating stage (A-B), the dwell time in the center of the heater, and the upward collapse in progress. The complete simulations show the progression of the temperature profiles during the whole, dynamic process. The snap shots illustrate some important moments in this process.

Figure 3A:
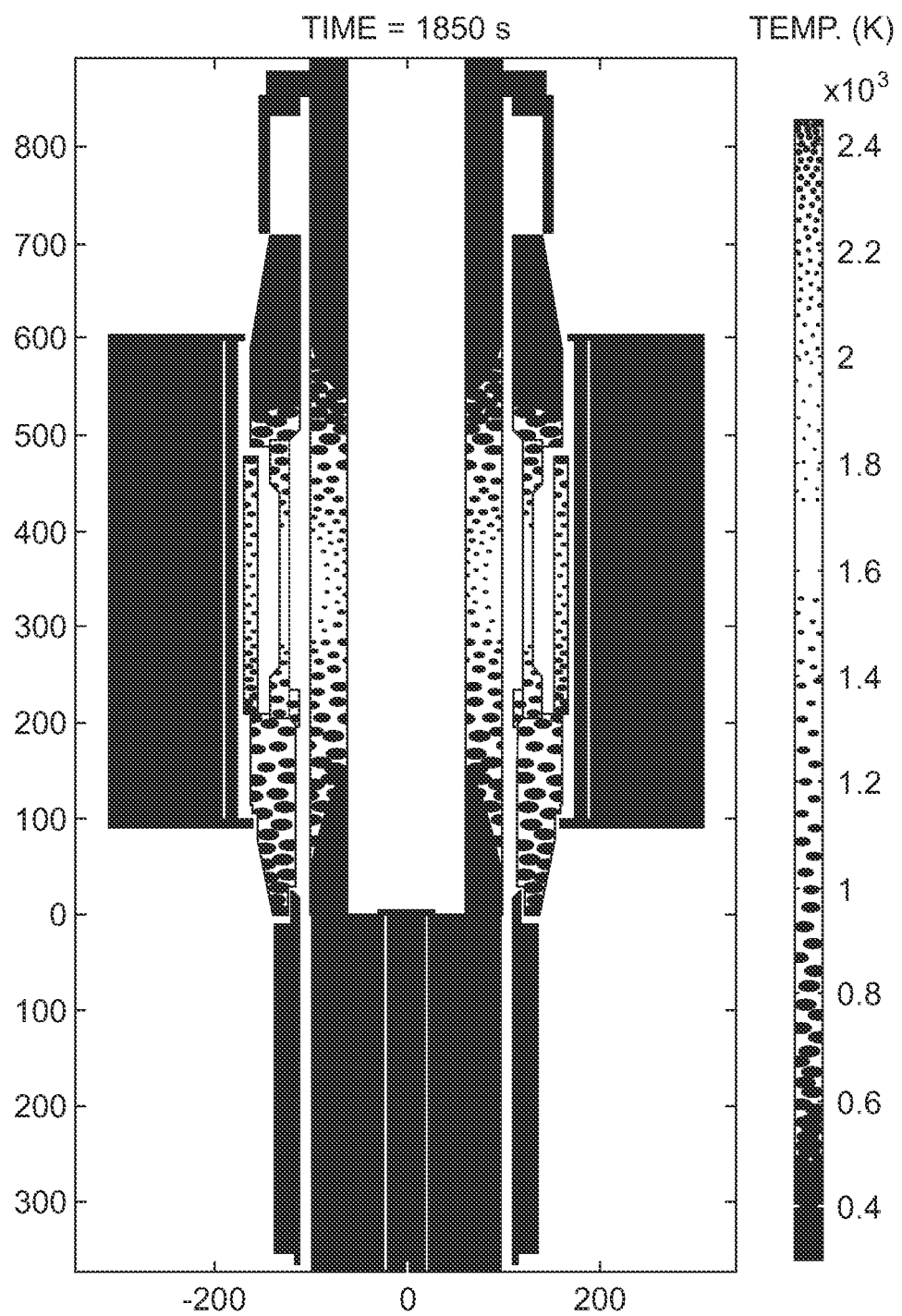
FIGS. 3A, 3B, 3C, and 3D illustrate four steps in a FEM simulation of the upward collapse process, depicting a glass body positioned in a heating element.
Figure 3B:
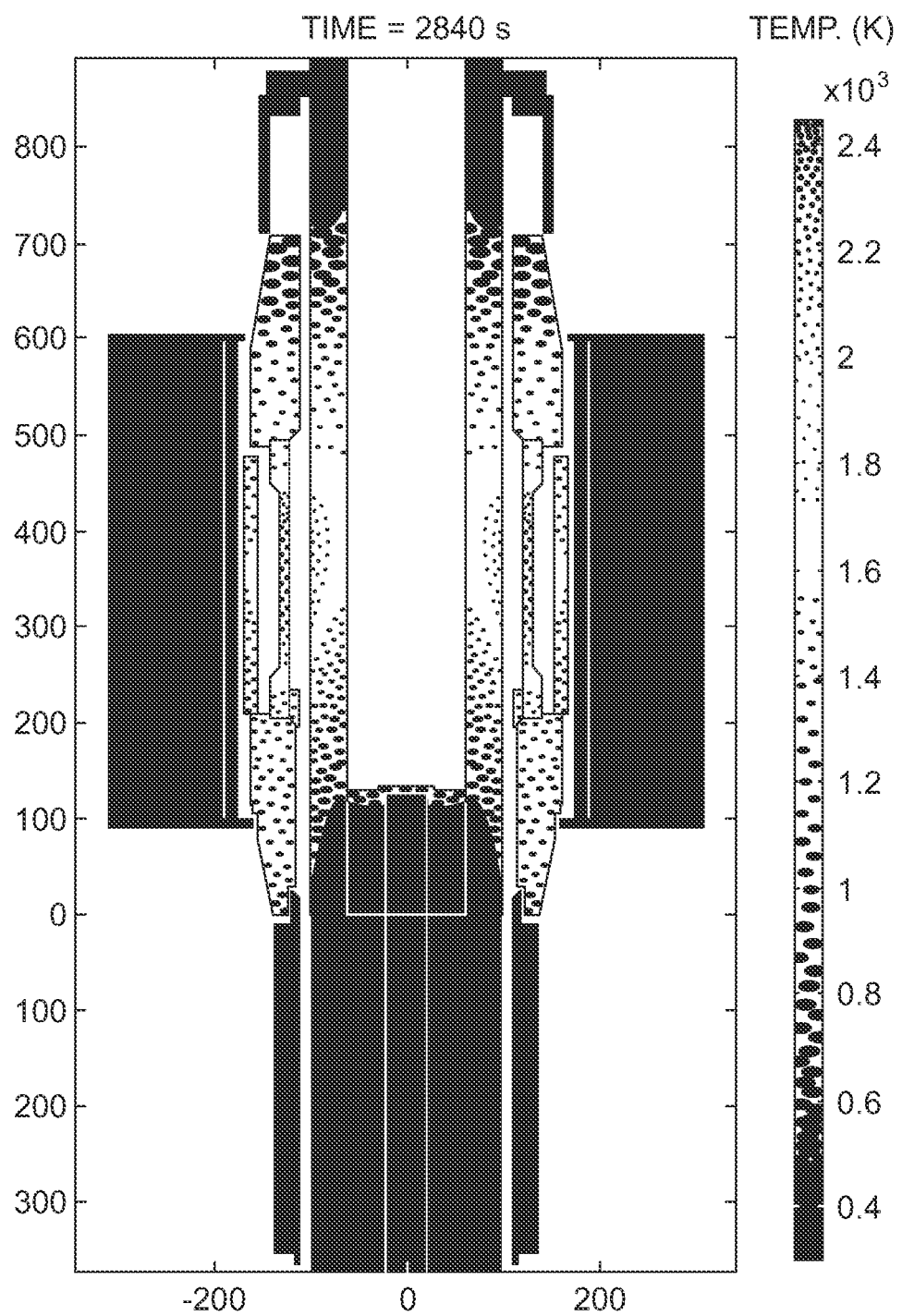
Figure 3C:
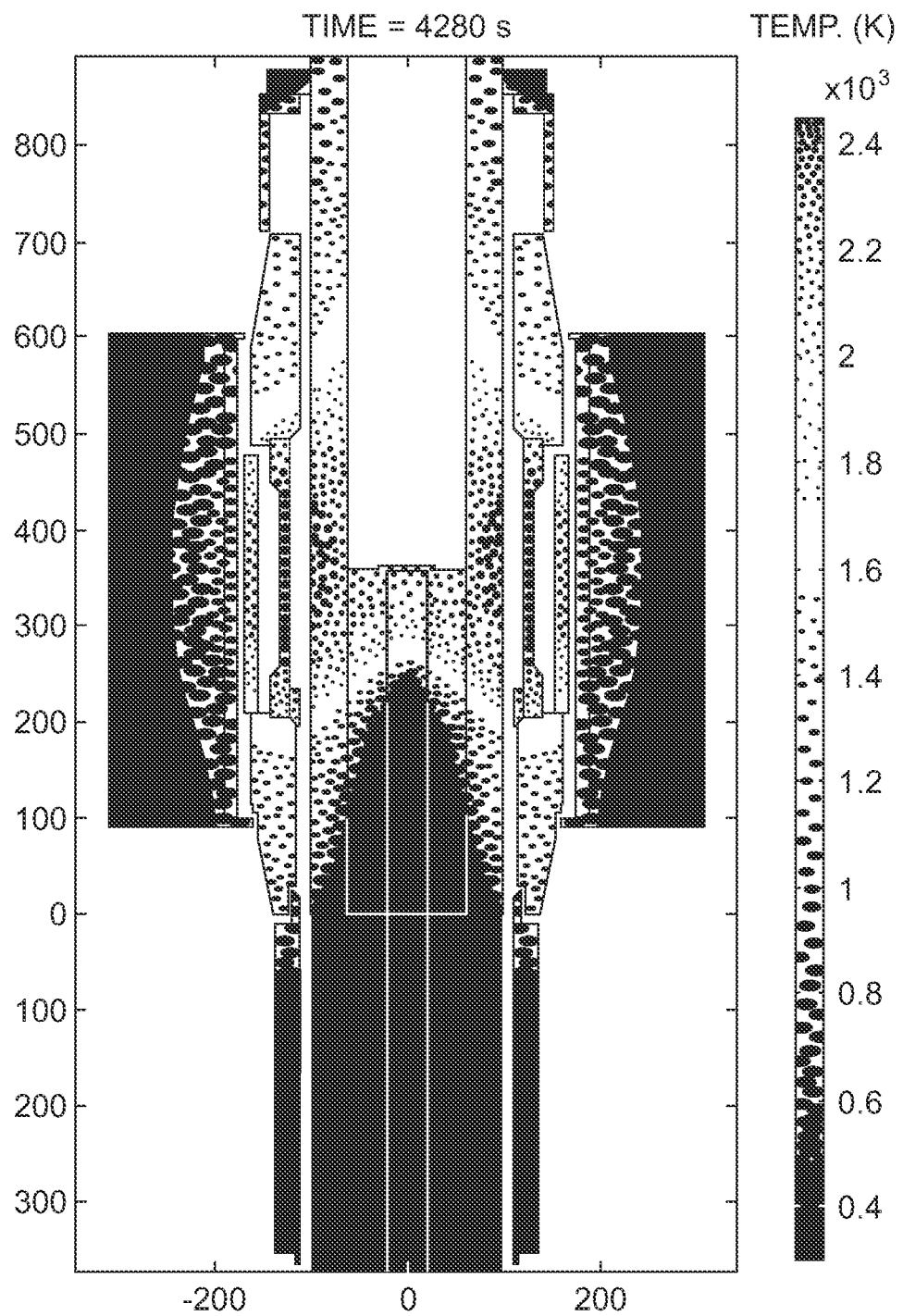
Figure 3D:
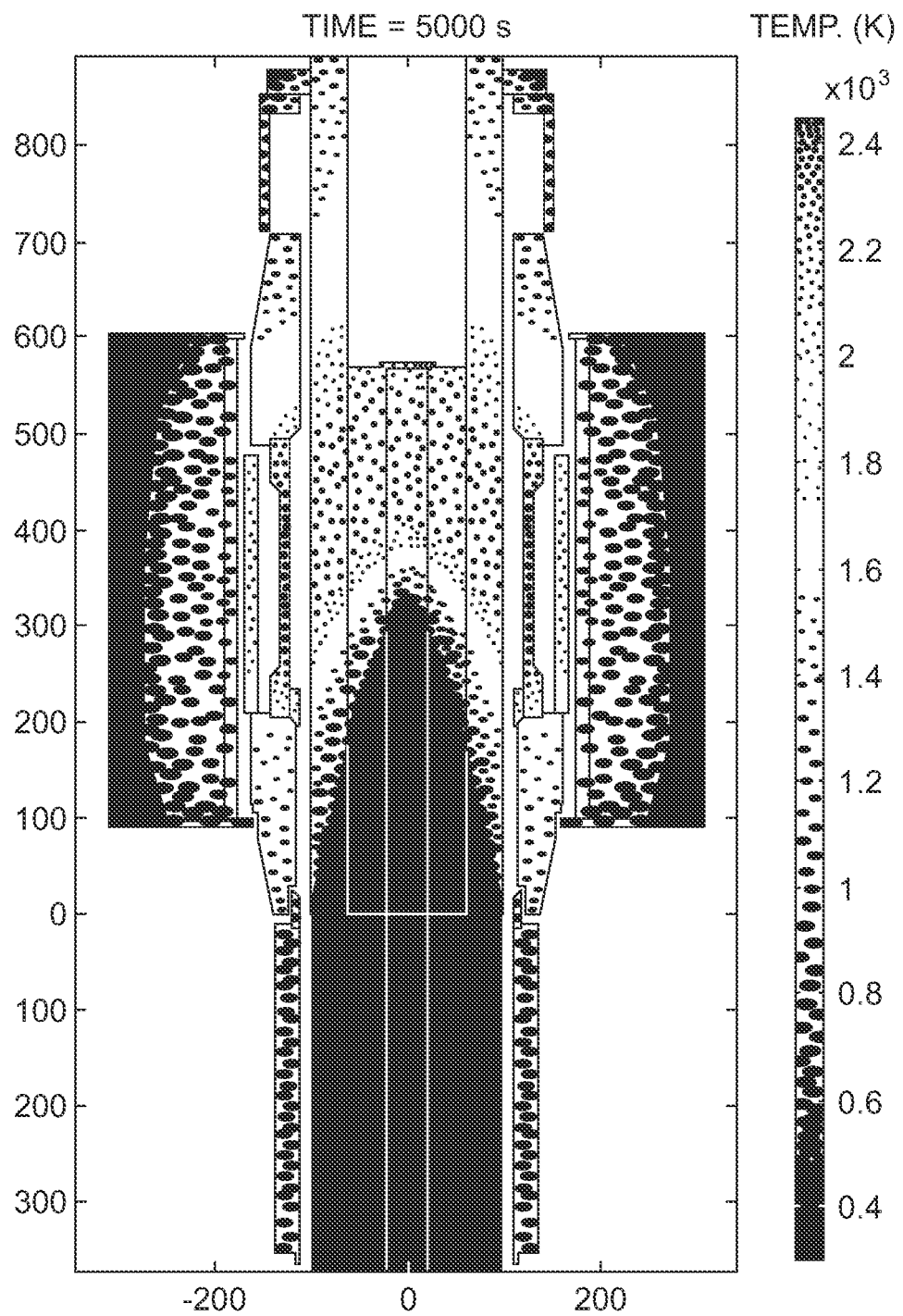

FIG. 3A shows the temperature profile of heating zone 16, glass body 20, and bottom collar 44 after the oven has been heating for 1,860 seconds, just before movement of the cylinder begins. FIG. 3B shows the temperature profile of the glass body 20 at 2,840 seconds into the process as the top of the glass body 20 reaches the bottom of the heating zone 16. FIG. 3C shows the temperature profile of the glass body 20 at 4,280 seconds into the process when the top of the glass body 20 has reached the center of the heating zone 16 and paused in its motion for seven minutes. FIG. 3D shows the temperature profile of the glass body 20 at 5,000 seconds into the process. The top of the glass body 20 has moved above the center of the heating zone 16. The glass body 20 and the core rods 30 reach the temperature required for collapse at approximately 100 mm above the center of the heating zone 16. FEM simulation provides information about the glass temperature, viscosity, stress, and flow inside the heating zone 16. FEM simulation was used to identify the recipes efficiently, for a heating zone 16 (and heating element) having a length of about 290 mm, which minimized the number of actual trials needed.

A typical recipe used to heat up the heating element of the heating zone 16 is 50 kW for 30 minutes, 100 kW for 10 minutes, 150 kW for 10 minutes, 200 kW for 10 minutes, 220 kW (or somewhat lower maximum power, for example 212 kW) into the steady-state of the process. The bottom collar holder and vacuum unit 52 located at the bottom of the apparatus 10 moves at a velocity V1, while the top collar holder and vacuum unit 54 located at the top of the apparatus 10 moves at a velocity V2. Typically, at the start of the process V1=V2. In a typical recipe, V1=V2=13.5 mm/minute for 6 minutes after 100 kW is reached for 2 minutes. Then the assembly is stopped for 4 minutes. After the 4 minute pause, the assembly moves up again at 13.5 mm/minute until the top weld 42 reaches the center of the heating element. Once the top weld 42 reaches the center of the heating element, the assembly is stopped for 6 minutes. Then the assembly is moved up again at V1=V2 for steady state collapse.

When the top weld 42 is about 110 mm to about 135 mm above the center of the heating zone 16, the vacuum pump of the bottom collar holder and vacuum unit 52 is activated (i.e., turned on). Such activation draws a vacuum in the direction of arrow 56 and causes the pressure in the top collar 40 to start decreasing. When the pressure in the top collar 40 stops decreasing, the top of the cladding 32 will have collapsed, the gap 31 will have closed, and the cladding 32 will have sealed or fused with the core rod 30. At this moment, the vacuum keeps pumping at the bottom collar holder and vacuum unit 52 while back filling gas (e.g., nitrogen gas $N_2$) to the top collar 40 until the pressure reaches about 1 atm. Then the top collar 40 is connected to air.

The vacuum pump of the top collar holder and vacuum unit 54 can be activated (i.e., turned on) to draw a vacuum in the direction of arrow 58. Similarly, a purging of the gas (typically an inert gas such as argon, helium, or, most typically, nitrogen) used in the heating element of the heating zone 16 can be achieved by introducing gas into the heating element in the direction of arrow 60. The gas purging occurs between the outer surface of the glass body 20 and the surface of the heating element, to prevent soot generation on the outer surface of the glass body 20 and oxidization of the heating element. The gas purging at the top of the heating element is typically on from the beginning of the process. It is important to identify a proper purging rate (9 $m^3$/h, for example) so that no soot or other deposits are formed on the surface of the preform during or after the process.

When the bottom weld 46 is a predetermined distance below the center of the heating zone 16 (for example, about 500 mm), the power of the heating element starts to decrease linearly. When the bottom weld 46 reaches the center of the heating zone 16, the power of the heating element should be at a predetermined ending power value (for example, about 150 kW to about 160 kW). While maintaining this ending power, the assembly should still keep moving up for a short distance (for example, about 50 mm). This process step suppresses the end phase temperature rise and avoids overheating and slumping of the glass near the bottom.

When the bottom weld 46 is a short distance above the center of the heating element (for example, about 50 mm), the process is complete. At this position, power to the heating element is turned off completely and assembly movement is stopped at the same time. The vacuum pumping can be maintained for a short period of time (for example, 1 to 2 minutes) after the process stops to guarantee the complete collapse of the cladding 32 to the lower end 24 of the glass body 20. Maintaining the vacuum is not necessary if the end phase heating recipe is 100% correct, however, and maintaining the vacuum for extra time may also carry the risk of deforming the bottom collar 44.

Figure 4A:
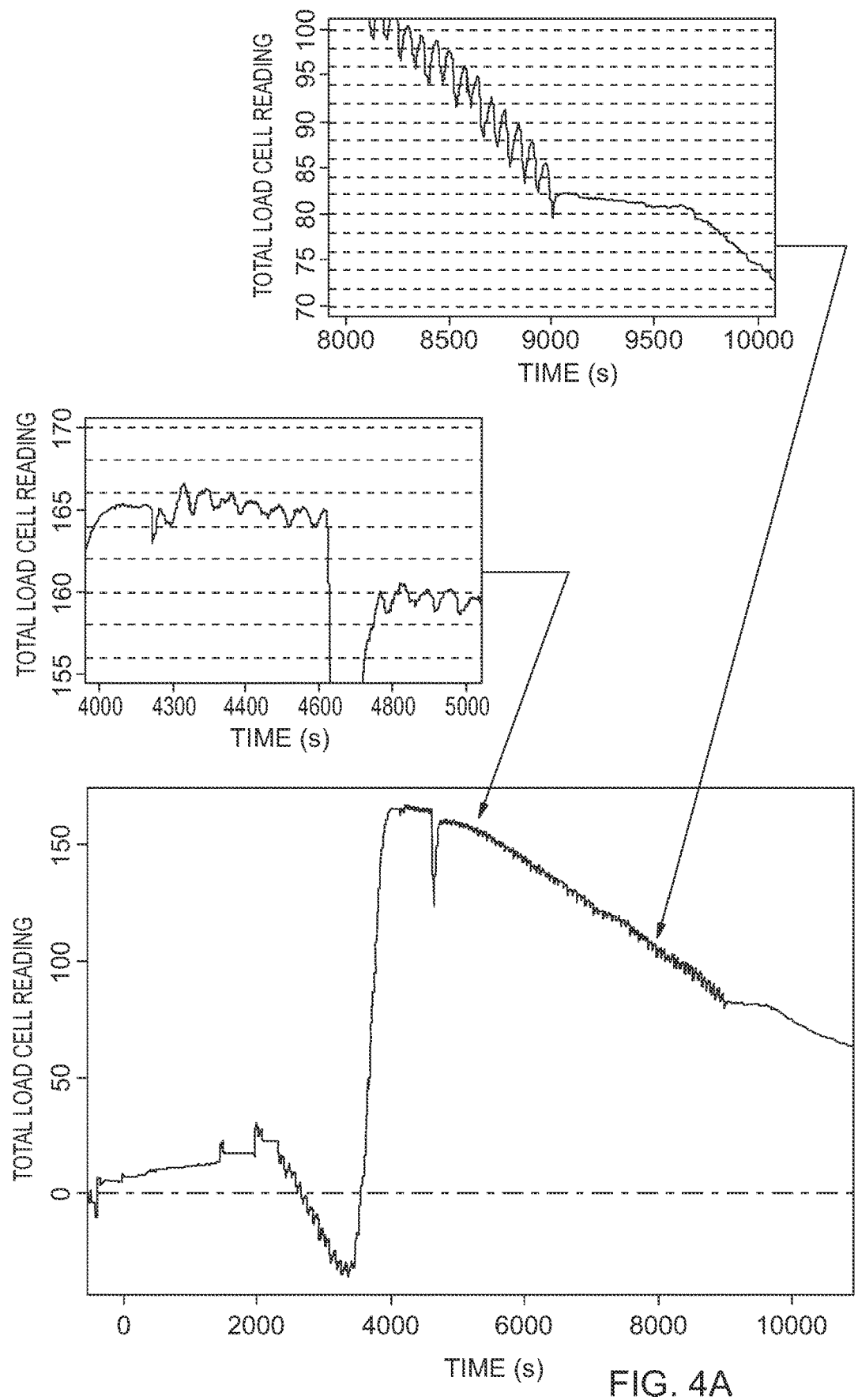
FIG. 4A illustrates load cell reading "ripples" reflecting a relatively large amplitude which indicates that the process run is on the cold side.
Figure 4B:
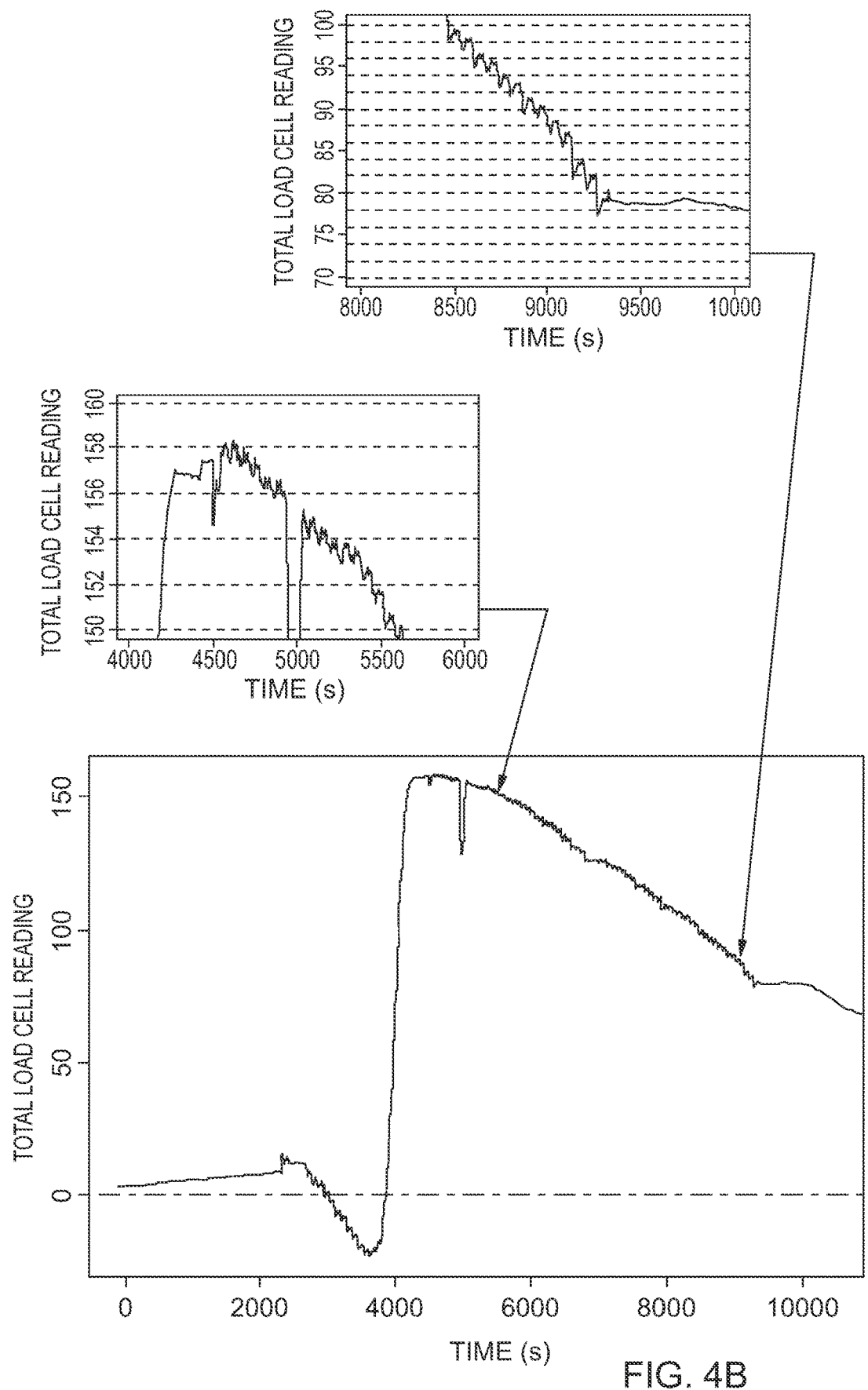
FIG. 4B illustrates load cell reading "ripples" reflecting a relatively small amplitude which indicates that the process run is on the hot side.

A load cell 68 was used to measure the total weight being supported by the bottom collar 44. It was discovered that if a slight constant oscillation perturbation is superimposed onto the velocity V2 of the top collar and vacuum unit 54 and the velocity V1 of the bottom collar holder and vacuum unit 52 is kept constant, "ripples" appear on the load cell reading curve as shown in FIGS. 4A and 4B. The bigger the amplitude of the "ripple," the colder the process. This is because with a colder process, the softened glass at the center of the heating element is more rigid and more able to translate the force of the oscillation to the bottom of the assembly. With constant heating element power settings, this information indicates whether the process is on the slightly hotter side or slightly colder side due to the actual condition of the heating element. For example, FIG. 4A illustrates a relatively large amplitude and, thus, a process on the cold side; FIG. 4B illustrates a relatively small amplitude and, thus, a process on the hot side. Based on this knowledge, one can determine the ending power of the process, i.e., the colder the process, the higher the ending power needs to be. This "ripple" amplitude is basically a true viscosity measurement of the glass body 20 at the center of the heating element, which is much more reliable than any glass surface temperature measurement with a pyrometer.

Thus, the apparatus 10 and related upward collapse process permit viscosity measurements of the glass body 20 at the center of the heating element by imposing an oscillating movement. A small oscillation is imposed onto the position at the top of the preform assembly. In parallel the weight of the preform assembly is measured by the load cell 68. The measurement of the load cell 68 provides an indirect measurement of the viscosity of the glass body 20 at the center of the heating element. This information can be used to control the temperature/heating power of the heating zone 16 using, for example, a controller 88 (discussed below).

As a distinct difference from the conventional downward draw processes, the stacked core rods 30 are supported by the spacer 48 at the bottom of the stacked core rods 30 instead of being supported by a vacuum, essentially fixing the position of the core rods 30 with respect to the cladding 32 during the overclad and draw process. In other words, the upward collapse process does not require a vacuum to prevent core rod movement which can result in clad-to-core waveguide distortion and therefore a fiber cutoff wavelength problem. Furthermore, in contrast to the conventional downward draw process, the weight of glass both above and below the molten glass in the heating zone 16 is well supported by the top collar 40 and the bottom collar 44 in the upward draw process, which essentially eliminates the clad-to-core waveguide distorting effects conventionally caused in the heating zone 16 by gravitational and vacuum forces. This difference allows the upward collapse process to be much more tolerant when a heating element or collapse temperature runs on the cold side (because the glass does not have be softened sufficiently to translate a pressure difference from the vacuum and support the core rods 30).

The upward collapse process also allows a partial pressure in the gap 31 between the core rods 30 and cladding 32 (up to atmospheric pressure or a little more, typically about 1,100 mbar) because there is no need for vacuum to support the weight of the core rods 30. Therefore, a reactive interface treatment gas such as sulfur hexaflouride (SF6, which is safe to handle at room temperature) can be freely applied during the high-temperature collapse in the direction of interface treatment gas arrow 62 to etch away any potential interface contamination such as metallic particles or surface hydroxide (OH). In addition to sulfur hexaflouride, other suitable reactive interface treatment gases include oxygen ($O_2$), chlorine ($Cl_2$) although safety concerns would arise, fluorine ($F_2$), nitrogen trifluoride ($NF_3$), silicon tetrafluoride ($SiF_4$), carbon tetrafluoride ($CF_4$), and fluoroform ($CHF_3$). Use of a reactive interface treatment gas to etch, clean, and dry the preform interface yields an improved interface, an enhanced optical fiber quality (reduced fiber breaks, bubbles, loss, or airlines), and a lower core rod D/d ratio.

As mentioned in the previous paragraph, the upward collapse process is much less vulnerable to differential core-clad glass flow or waveguide distortion effects because the stacked core rods 30 are supported from below by the spacer 48 and the weight of the glass both above and below the heating zone 16 (where the glass is softened) is also supported. Such support eliminates the problem of uncontrolled glass flow and distortion. Therefore, there is a natural advantage of processing low viscosity glass material (such as heavily F-doped cladding 32) without risking clad-to-core waveguide distortion from excess heating or from gravitational and vacuum forces. This provides an important processing advantage for a certain class of fiber designs with F-doped cladding 32 materials.

Returning to FIG. 1, a glass disk 70 with an outside diameter slightly smaller (i.e., typically about 126 mm) than the inside diameter of the top collar 40 is placed on top of the core rods 30 and the cladding 32 and inside the top collar 40. The disk 70 may be about 5 cm thick. During the start-up of the process, after the 6 minutes dwell time of the top weld 42 at the center of the heating element, a vacuum is applied from both the bottom collar holder and vacuum unit 52 and the top collar holder and vacuum unit 54. The vacuum collapses the top collar 40 onto the disk 70. By setting V2>V1, a tip is pulled on top of the cladding 32 before the steady-state collapse of the rest of the cladding 32 where V2=V1. The result is a low-cost and high-yield online preform tipping process, which yields preforms that are easiest and most efficient for subsequent fiber draw. The integrated online preform tipping process saves substantial amounts of both effort and cost (e.g., saves an extra heating step) over the conventional offline tipping process.

If V2 is set to be higher than V1 when the interface collapse has been initiated and continues, the upward collapse process can also stretch or draw upward a preform with a diameter significantly smaller than the original diameter of the cladding 32. The diameter of the stretched (or even compressed) preform can be accurately controlled by the precise settings of linear vertical speeds V1 and V2 through the law of conservation of mass. The start-up loss of good preform glass is much less for the upward collapse process, however, than for the conventional downward draw process and it can therefore result in a significant cost saving for the stretched preforms.

The upward collapse process is also a completely contact-free process for the finished preform because the weight of glass both above and below the heating zone 16 (where the glass is softened) is supported by the top collar 40 and the bottom collar 44 while the outer surface of the preform itself is untouched. Avoidance of preform contact and therefore any lateral or transverse force results in both a very clean preform surface and a preform with very little bow, unlike in the conventional downward draw process where puller wheels are always in contact with, and apply force to, the preform throughout the process.

In many conventional downward draw processes, small contact areas exist between the puller wheels and the preform circumference. Such contact can introduce impurities or contaminants on the preform surface. In addition, puller wheels can assert lateral force in the downward draw process causing preform bow (which becomes exacerbated for longer preforms, i.e., bow increases as the square of the preform length for the simple curvature case). The amount of contact force that can be applied to the preform by the puller wheels is limited because excessive pressure can damage the glass surface of the preform. Therefore, for large preforms that require a greater pulling force than can be applied by a single set of puller wheels, multiple sets of puller wheels may be applied to the preform at different levels to achieve the necessary total vertical (frictional) force to support preform weight. But multiple sets of puller wheels increase both apparatus height and cost. Further, low bow in the preform can only be achieved with multiple sets of puller wheels if the sets of puller wheels are precisely aligned, which is difficult to achieve in practice. The contact-free upward collapse process yields a preform with very little bow due to the lack of any lateral forces applied to the preform.

Returning again to FIG. 1, the apparatus 10 may optionally include a gripper system 80 attached to the frame 12. A suitable gripper system 80 is described more fully in International Patent Application No. PCT/US2015/012471, titled "Formation Of Elongated Glass Components With Low Bow Using A Gripper Device" and filed on Jan. 22, 2015 by the assignees of the subject application, Heraeus Tenevo LLC & Heraeus Quarzglas GmbH & Co. KG. In one embodiment, the gripper system 80 is included with the apparatus 10 by attaching the gripper system 10 to the frame 12.

The gripper system 80 includes clamping elements 82 and mounting elements 84 attaching the clamping elements 82 to the gripper system 80. The gripper system 80 may move vertically parallel to the length of the frame 12 (defined in FIG. 1 as the Z direction). The mounting elements 84 allow translational movement of the clamping elements 82 in the X direction and the Y direction (i.e., to any position within the X-Y plane). (Although neither necessary nor preferred, a chuck system may also be used that allows rotation—especially if a torch, rather than a furnace, were to provide the heating element.) In one embodiment, the mounting elements 84 are X-Y tables including a pair of arms mounted on linear bearings or linear rails and a motor, for example a manual or servo motor drive, to control movement of the arms. The mounting elements 84 are further low-friction devices, so that a force applied to the clamping elements 82 by an external object will result in the clamping elements 82 being deflected along the mounting elements 84 rather than the clamping elements 82 applying a resistive force to the external object.

Once the preform has formed, the gripper system 80 may be attached by moving the clamping elements 82 into contact with the bottom collar 44 or (as shown in FIG. 1) the bottom collar holder and vacuum unit 52. The clamping elements 82 preferably should not contact the preform. The clamping elements 82 may be sized to have convex regions having the opposite shape of the bottom collar 44, so that the clamping elements 82 fit securely around the bottom collar 44 without causing damage to the bottom collar 44. The clamping elements 82 may contact all or (as shown in FIG. 1) only a portion of the outside surface of the bottom collar 44 or the bottom collar holder and vacuum unit 52. In an exemplary embodiment, the clamping elements 82 may be made of a high temperature compressible material such as calcium silicate, asbestos, compressed glass, or ceramic fibers (e.g., rock wool) or high temperature rubber (e.g., silicone or fluoropolymer elastomers).

The clamping elements 82 are first aligned with the center of the bottom collar 44 or the bottom collar holder and vacuum unit 52 by determining the center of the bottom collar 44 or the bottom collar holder and vacuum unit 52 and then moving the clamping elements 82 into alignment with the center in the X direction. In some embodiments, the clamping elements 82 may be aligned to an estimated center of the bottom collar 44 or the bottom collar holder and vacuum unit 52, for example the expected center based on the desired travel path. In other embodiments, in order to more accurately align the clamping elements 82 with the bottom collar 44 or the bottom collar holder and vacuum unit 52, the apparatus 10 may further include a sensing element capable of locating the center of the bottom collar 44 or the bottom collar holder and vacuum unit 52 and a computer for determining the center from the output of the sensing element. The sensing element may include one or more laser devices, a camera/vision system, or a mechanical contact (dial indicator) system. In an exemplary embodiment, the sensing element may be attached to the gripper system 80 or may be external to the gripper system 80, for example attached to the frame 12. In another embodiment, the sensing element may be external to both the gripper system 80 and the frame 12, for example cameras. Because the gripper system 80 includes further elements to prevent misalignment, it is not necessary for the gripper system 80 to perfectly align with the center of the bottom collar 44 or the bottom collar holder and vacuum unit 52.

Once the clamping elements 82 are aligned, the clamping elements 82 are brought into contact with the bottom collar 44 or the bottom collar holder and vacuum unit 52 by movement of the mounting elements 84 in the X direction. The mounting elements 84 may be moved by any suitable mechanism, for example a motor used to control the pair of arms of an X-Y table. Because the mounting elements 84 are low-friction devices, if the clamping elements 82 attempt to attach to the bottom collar 44 or the bottom collar holder and vacuum unit 52 while not properly aligned with the center, the force of the bottom collar 44 or the bottom collar holder and vacuum unit 52 pushing against the clamping elements 82 will move the clamping elements 82 into an aligned position instead of the bottom collar 44 or the bottom collar holder and vacuum unit 52 being moved. The mounting elements 84 may further include a locking mechanism that may be engaged and disengaged to prevent movement of the clamping elements 82 once the clamping elements 82 are attached to the bottom collar 44 or the bottom collar holder and vacuum unit 52. While the clamping elements 82 are being moved into position, the locking mechanism is unlocked, so that the clamping elements 82 may be moved by the motor while still being displaced by any additional force applied to the clamping elements 82. Once the clamping elements 84 are in contact with the bottom collar 44 or the bottom collar holder and vacuum unit 52, the locking mechanism is engaged to prevent further movement of the clamping elements 82 in the X-Y plane.

To detect misalignment, in one embodiment the gripper system 80 further includes a force sensing device, such as load cells, to sense reaction forces to measure the reaction force that occurs during the process of the clamping elements 82 attaching to the bottom collar 44 or the bottom collar holder and vacuum unit 52. Load cells are transducers that convert a force applied to the clamping elements 82 to a strain gauge (not shown) of each load cell into an electrical signal. The electrical signal may then be measured and correlated to the force applied to the strain gauge. Exemplary load cells include hydraulic load cells, pneumatic load cells, and strain gauge load cells. Should the clamping elements 82 not be properly aligned with the center of the bottom collar 44 or the bottom collar holder and vacuum unit 52, the reaction force will be greater than if the clamping elements 82 are properly aligned. By measuring the reaction force with the force sensing device, misalignment may be detected and corrected before the clamping elements 82 apply a force to the bottom collar 44 or the bottom collar holder and vacuum unit 52 sufficient to result in movement of the bottom collar 44 or the bottom collar holder and vacuum unit 52. In one embodiment, the force sensing device may be used in conjunction with the low-friction mounting elements 84, where the speed at which the clamping elements 82 are attached to the bottom collar 44 or the bottom collar holder and vacuum unit 52 is slowed in response to a greater-than-expected reaction force in order to allow the clamping elements 82 to move on the mounting elements 84 into an aligned position. In an exemplary embodiment, the clamping elements 82 may be moved toward the bottom collar 44 or the bottom collar holder and vacuum unit 52 at a rate ranging from approximately 50 mm/minute to approximately 100 mm/minute while no misalignment is detected by the force sensing device, and the rate reduced to approximately 10 mm/minute to approximately 25 mm/minute if misalignment is detected. In other applications, the clamping speeds may exceed these ranges.

In summary, the gripper system 80 helps to support the preform assembly weight (which may be about 350 kg or more), replacing the conventional full-contact puller wheel system. The gripper system 80 permits floating positioning of the glass body 20 used to make the preform in the horizontal (X-Y) plane and precision linear movement in the vertical (Z) direction for exact alignment and control of preform geometry and preform tipping process. Especially when the gripper system 80 is incorporated, the apparatus 10 avoids lateral or transverse forces on the preform, thereby minimizing and perhaps eliminating preform bow; can monitor glass behavior during heating using a load cell; and permits the use of physics (conservation of mass) to control dimensions precisely (eliminating the expense of conventional online measurements and feedback controls).

In addition, the apparatus 10 and related upward collapse process can be used in combination with a preform measurement device. A suitable preform measurement device is described more fully in International Patent Application No. PCT/US2014/050368, titled "Methods And Apparatus For Determining Geometric Properties Of Optical Fiber Preforms" and filed on Aug. 8, 2014 by the assignees of the subject application, Heraeus Tenevo LLC & Heraeus Quarzglas GmbH & Co. KG.

Figure 5:
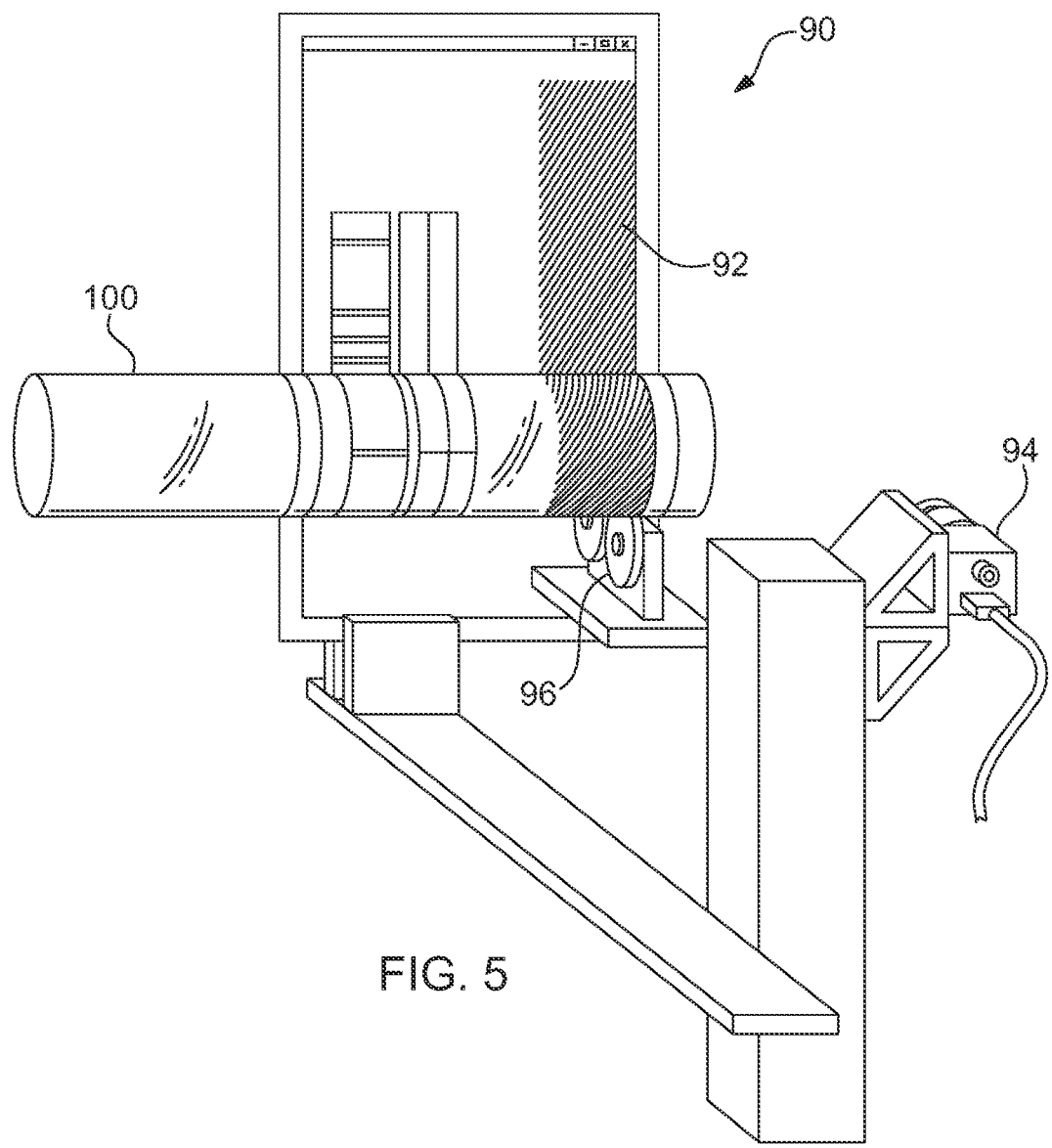
FIG. 5 is a schematic view of an embodiment of a preform measurement device used in combination with the apparatus shown in FIG. 1.

FIG. 5 is a schematic view of an embodiment of the suitable preform measurement device 90 for determining one or more geometric properties of an optical fiber preform 100. Referring to FIG. 5, the device 90 includes a two-dimensional pattern 92 and an image capturing unit 94. In the embodiment depicted in FIG. 5, the image capturing unit is a digital camera. The preform measurement device 90 shown in the embodiment depicted in FIG. 5 includes a support and driver 96 configured to rotate the optical fiber preform 100 about its longitudinal axis. The portion of the support and driver 96 shown in FIG. 5, positioning the right end of the optical fiber preform 100, also includes the support and driver 96 configured to rotate the preform 100. The support and driver 96 may be a unitary structure or the support and the driver may be separate components. The support is structured to align the preform 100 between the two-dimensional pattern 92 and the image capturing unit 94 such that the images captured are of the two-dimensional pattern 92 as viewed through the preform 100.

One exemplary method of using the preform measurement device 90 includes the following steps: providing an optical fiber preform 100 having a longitudinal axis, an outer diameter and a circumference; providing a two-dimensional pattern 92 having a length parallel to the longitudinal axis of the preform 100 and a width greater than the outer diameter of the preform 100; providing an image capturing unit 94 disposed such that the preform 100 is aligned between the two-dimensional pattern 92 and the image capturing unit 94; rotating the preform 100 about its longitudinal axis and acquiring a first plurality of images of the two-dimensional pattern 92 viewed through the preform 100 at two or more different points along the circumference of the preform 100; and determining at least one geometric property of the preform 100 from the first plurality of images.

Geometric characteristics or properties of the optical fiber preform 100 that can be determined in accordance with the preform measurement device 90 and related method include the diameters, ovalities, D/d ratio, overclad OD/ID ratio, eccentricities of the core rods 30 and core eccentricities of the finished preform 100, as well as overall preform bow. Thus, the preform measurement device 90 and related method provide an automated, non-destructive, and production-friendly measurement of waveguide and geometrical properties. They also provides a value-added guarantee of waveguide quality for users of the preform 100 and a potential opportunity to fine tune the process of creating the optical fiber.

A controller is a hardware device or a software program that manages or directs the flow of data (i.e., facilitates communication) between two components. The apparatus 10 includes a controller 88. The controller 88 provides the ability to obtain data from, for example, the load cell 68, the gripper system 80; the top and bottom collar holder and vacuum units 52, 54; and the vacuum and treatment gas systems, and to use that data to control the other components of the apparatus 10 and the related upward collapse process. The controller 88 has programmed in it, in a manner well-known to those skilled in the art, a preset control program or routine to assure efficiently the optimum heating and movement process recipe. More specifically, the controller 88 can define, for example, the velocities V1 and V2, the flow rates of gases, and the pressure of the vacuum pumps. The controller 88 helps to assure a robust and reproducible "one button" automated process for production.

An important advantage of the upward collapse process is minimization, perhaps elimination, of waveguide (clad-to-core) distortion. Sources of waveguide distortion are the gravitational and vacuum forces on the core rod and molten glass inherent in conventional processes and eliminated by the upward collapse process. Waveguide distortion is a problem that is rarely, if ever, addressed in the RIT/RIC field. The lack of problem recognition may be because past optical fiber performance requirements were much less stringent, so the field tended to treat optical preforms just like a simple glass rod without worrying about the actual waveguide (clad-to-core) distortion effect which can result, for example and among other things, in fiber cutoff wavelength failure.

World-wide connected devices, cloud services, 5G (5th generation mobile networks or 5th generation wireless systems, which denotes a major phase of mobile telecommunications standards), and Industry 4.0 (or the fourth industrial revolution, the current trend of automation and data exchange in manufacturing technologies including cyber-physical systems, the Internet of things, and cloud computing), and other advances are driving an exponentially increasing demand for bandwidth. Therefore, optical fiber manufacturers must increase their output and productivity. For next generation optical fiber manufacturing, very large preforms drawn at high speeds are required. The result of the upward collapse process is a "ready-to-draw" solid preform that can sustain multiple days of uninterrupted optical fiber draw, increasing the productivity and optical fiber output as well as reducing the cost and realizing improved fiber yield for users of the preform.

The upward collapse process naturally includes the upward draw (and, optionally, stretch or compression) as well as the low-cost upward online tipping by collapsing the top collar 40 and by matching the outside diameter of the top collar 40 to the outside diameter of the cladding 32. These additional features of the upward collapse process can be done much more accurately and cheaply than for the conventional downward draw process via the exact physics of conservation of mass and glass flow. The upward collapse process, including the draw/stretch and tip features, can also achieve a nearly 100% tipped preform yield with minimal waveguide distortion at the preform end (i.e., more "good"

glass). It is also worth pointing out that, with the upward collapse process, the good preform glass yield is nearly 100% without the wasteful sacrificial starting material used for the start-up of the conventional downward draw process. And the consumption of the material used for the top collar 40 and the bottom collar 44 is also minimal in the upward collapse process.

A single overclad upward collapse process is described above. This process can be applied, however, to multiple overclad "gap" jacket tubes or cylinders with trivial modifications, such as increasing the outside diameter of the spacer 48 and slightly adjusting the maximum heating power and ending power. Furthermore, the upward collapse process is also capable of accommodating double (or even triple or more) length cladding 32 with the distinct advantage of no need for cladding inside diameter matching (i.e., a smaller inside diameter for the bottom cladding to support the core rods inside the top cladding, as in the case of the conventional downward draw process) because the weight of the stacked core rods 30 is completely supported from below.

The foregoing description of preferred embodiments of the invention should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims. It is expressly intended, for example, that all ranges broadly recited in this document include within their scope all narrower ranges which fall within the broader ranges. It is also expressly intended that, as is understood by those skilled in the art, certain steps included in the process may be omitted; certain additional steps may be added; and the order of the steps may be altered from the specific order described.

What is claimed:

1. An apparatus for creating a glass preform from a glass body having a weight, a circumference, at least one freestanding stacked core rod, and a cladding surrounding the at least one core rod and being separated from the core rod by a gap, the apparatus comprising:
    a top collar affixed to a top of the cladding, the top collar having an outside diameter approximately the same as or smaller than an outside diameter of the cladding;
    a bottom collar affixed to a bottom of the cladding, the bottom collar having an outside diameter either smaller than or approximately the same as the outside diameter of the cladding;
    a bottom collar holder and vacuum unit holding and supporting the bottom collar, thereby supporting up to the entire weight of the glass body without contacting an outer surface of the glass body, the bottom collar holder and vacuum unit removing gas from or introducing gas to the apparatus;
    a top collar holder and vacuum unit holding and supporting the top collar, the top collar holder and vacuum unit removing gas from or introducing gas to the apparatus;
    a load cell for measuring a weight supported by the bottom collar, the top collar, or both; and
    a frame defining a heating zone having a heating element to heat the glass body,
    the bottom collar holder and vacuum unit being adapted to be moved at a controlled velocity V1 in a vertical direction and the top collar holder and vacuum unit being adapted to be moved at a controlled velocity V2 in the vertical direction such that when a vacuum is applied from either the bottom collar holder and vacuum unit or the top collar holder and vacuum unit, the top collar, the cladding, and the core rods can be collapsed to form the glass preform,
    wherein the apparatus is configured to superimpose a constant oscillation perturbation onto the velocity V2 such that ripples appear on a measurement by the load cell reflecting a viscosity of the glass body at a center of the heating element.

2. The apparatus of claim 1, further comprising a glass disk having an outside diameter slightly smaller than an inside diameter of the top collar and being located on top of the at least one core rod and the cladding and inside the top collar, such that when the vacuum is applied to form the glass preform, the top collar collapses onto the glass disk and a tip is pulled on top of the glass preform.

3. The apparatus of claim 1, further comprising a gripper or chuck system including clamping elements adapted to contact the bottom collar or the bottom collar holder and vacuum unit and mounting elements attaching the clamping elements to the frame and allowing precise linear movement in the vertical direction of the clamping elements, thereby positioning and moving the glass body.

4. The apparatus of claim 1, further comprising a preform measurement device for determining one or more geometric or waveguide properties of the glass preform to assure quality of the preform.

5. The apparatus of claim 1, further comprising a controller managing a flow of data between and among at least the bottom collar holder and vacuum unit, the top collar holder and vacuum unit, and the heating element.

* * * * *